United States Patent [19]

Barry

[11] Patent Number: 4,981,410

[45] Date of Patent: Jan. 1, 1991

[54] SWINGING-LINKAGES ROTARY LOADER

[76] Inventor: Leonard D. Barry, 19300 Pennington, Detroit, Mich. 48221

[21] Appl. No.: 244,338

[22] Filed: Sep. 15, 1988

[51] Int. Cl.$^5$ ............................................. B65G 67/02
[52] U.S. Cl. .................................... 414/392; 414/334; 414/337; 414/917
[58] Field of Search ............... 414/334, 337, 338, 340, 414/344, 399, 390, 391, 392, 401, 584, 917, 744.2, 744.3, 744.5, 744.6, 744.7, 744.8; 104/20, 21, 28, 29, 30, 31, 49

[56] References Cited

U.S. PATENT DOCUMENTS

| | | | |
|---|---|---|---|
| 4,124,129 | 11/1978 | Barry | 414/337 X |
| 4,362,456 | 12/1982 | Barry | 414/334 |
| 4,370,085 | 1/1983 | Barry | 414/337 |
| 4,370,086 | 1/1983 | Barry | 414/337 |
| 4,483,652 | 11/1984 | Barry | 414/392 |
| 4,519,737 | 5/1985 | Barry | 414/337 |
| 4,746,257 | 5/1988 | Barry | 414/337 X |

Primary Examiner—Joseph E. Valenza
Assistant Examiner—James R. Bidwell

[57] ABSTRACT

These new rotary loaders for transfer of cargo containers or semitrailers to and from railway cars etc. are characterized by a load lift arm or frame or platform supporting two or more parallel swinging parallelogram arms each supported free to swing in a substantially vertical plane substantially independently of one another and all supporting a loadspreader pivotally connected on outward extensions of the parallelogram linkage arms. The loadspreader is therefore free to turn (without a central turntable) to enage and couple a vehicle and align the loadspreader therewith through the chord of a transfer arc of the load lift arm as the loader is rotated in one direction. The loadspreader is realigned for the next transfer by the weight of the load spreader and its load as the loader continues to turn out beyond the transfer arc and away from the vehicle. This plural parallelogram separate swinging mounting for the loadspreader is generally applicable to loaders to make them self aligning without a central turntable.

8 Claims, 3 Drawing Sheets

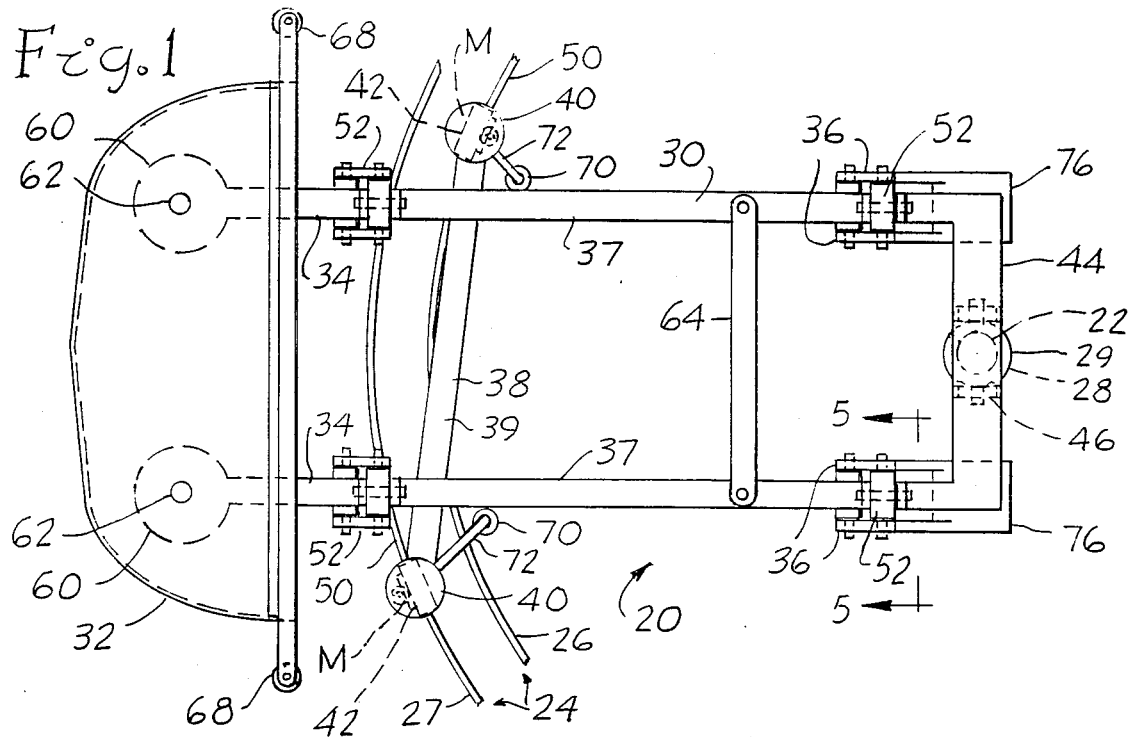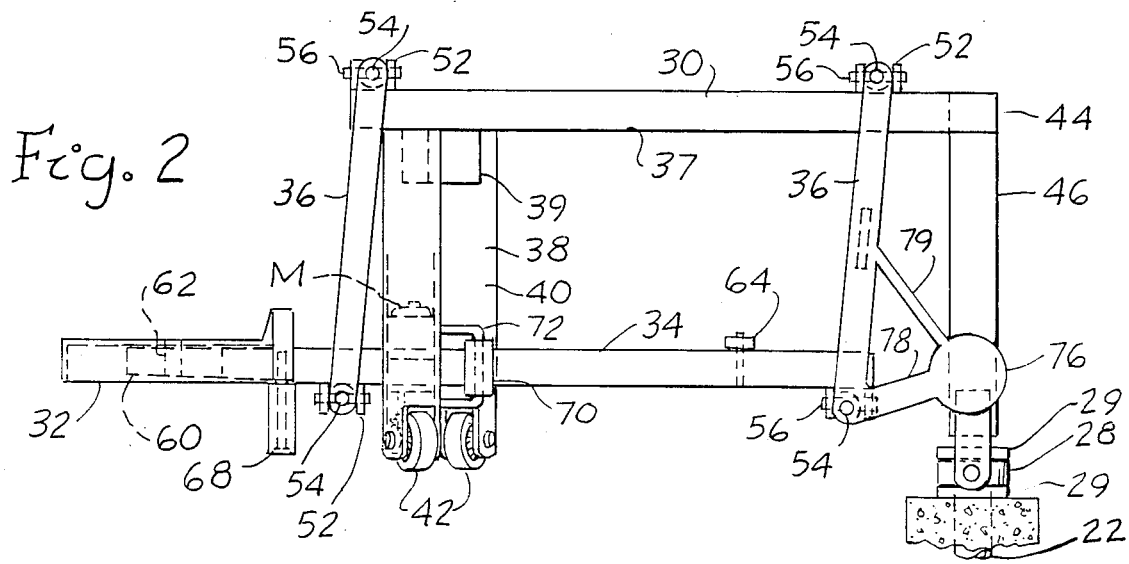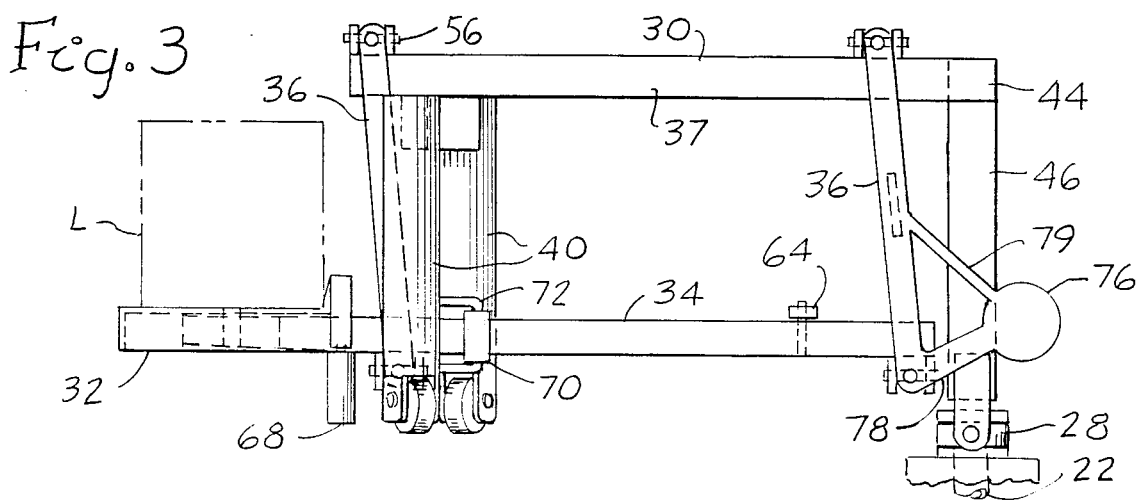

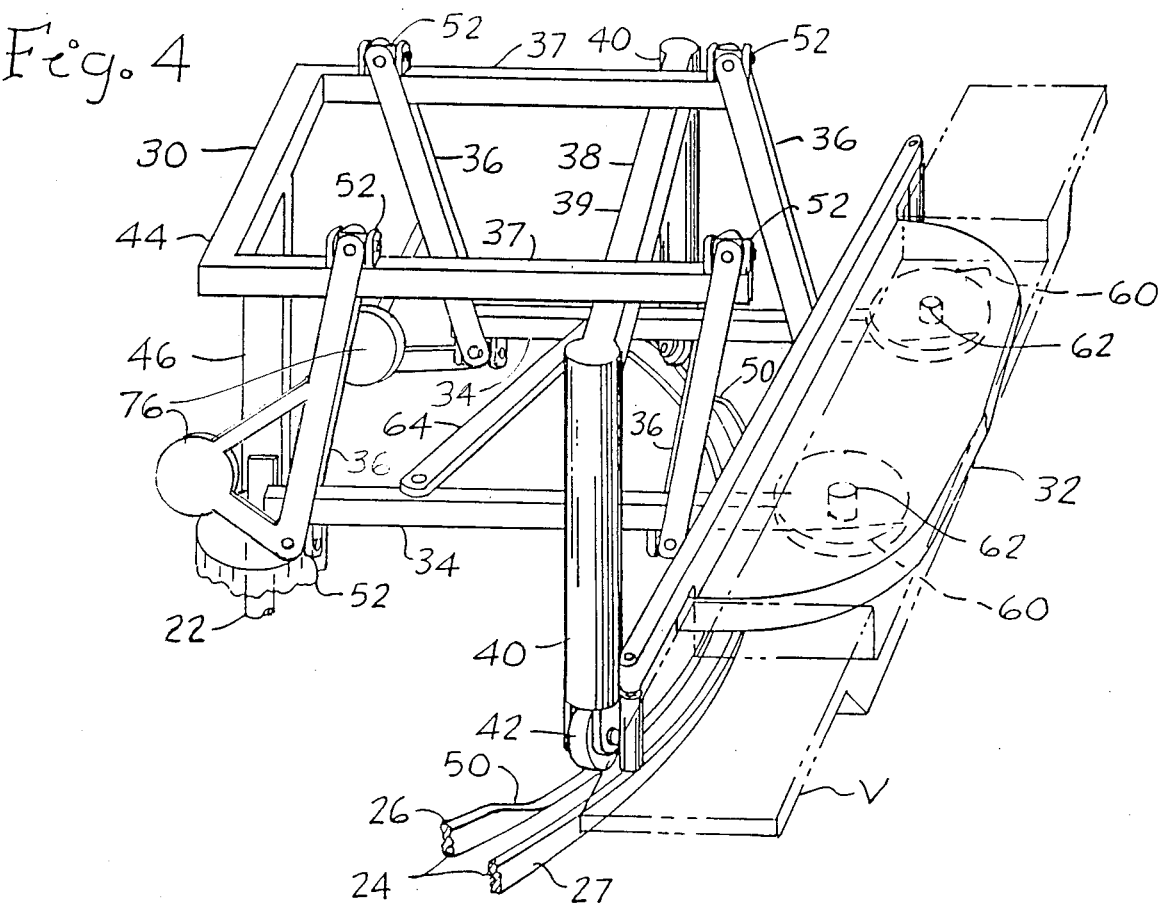
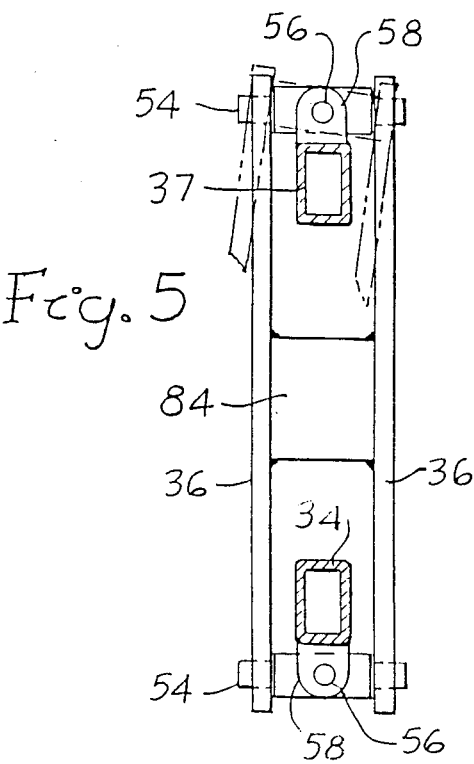
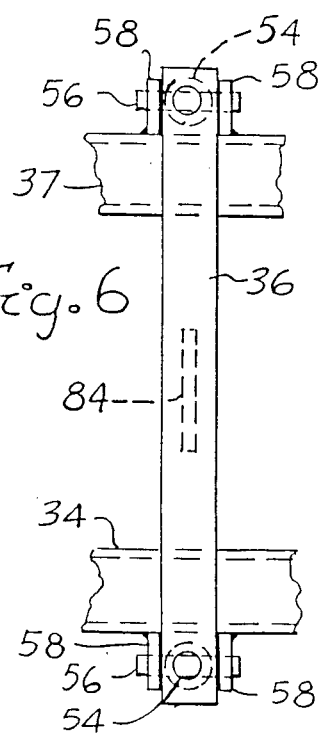
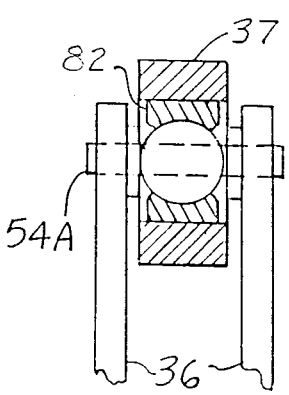

SWINGING-LINKAGES ROTARY LOADER

CROSS REFERENCES TO RELATED PATENTS

This invention relates to my pending U.S. patent application Ser. No. 07/234,476 filed in the U.S. Patent Office on Aug. 22, 1988, as a continuation-in-part, and to my U.S. Pat. Nos. 4,746,257; 4,370,086 and 4,362,456, and to lesser extent to other of my patents relating to rotary loaders.

The rotary loaders in my pending application and my patents which have a rotary arm to support the load have either a curved fork tine or arm with an alignment cradle (60 in my U.S. Pat. No. 4,362,456) for supporting each end of the load to roll or slide on the curved fork arm 58 to align, or a turntable (54 in my U.S. Pat. No. 4,370,086) supports a loadspreader. In either case the turning of the load is from one pivot point either in space as with the curved forks (each curved concentrically about an imaginary central pivot for the load) or a turntable. In either case it takes springs or air cylinders to realign the cradles or loadspreaders after each transfer.

The heavier the load on the turntable the greater the force needed to turn the turntable to be in position for the next transfer. It is important that the cradles or turntable turn easily when the loader engages the side of a vehicle, but the springs or other pressure means used to realign the heavy load on the cradles or turntable must overcome considerable friction and exert more force than desired against the side of the vehicle. It is therefore an object to eliminate the need for the restoring springs such as spring 58 in my pending application mentioned. It is an object to eliminate springs or air cylinders etc. to turn the loadspreader. It is an object to replace the turntable with means to align the loadspreader which is more responsive and sure to turn under both light or no load and heavy loads without excessive force and which is less expensive and of lighter weight than curved roller-ways.

It is the main feature of this invention to support the loadspreader on separate vertical free-swinging linkages especially one for each end of the loadspreader.

It is an object of this invention to have the weight of the loadspreader and the weight of the load thereon to turn the loadspreader.

It is an object to increase the side-coupling tolerance zone of the loader to align the loadspreader with a vehicle for transfer within a chord across more degrees of arc of a transfer run of the loader and vehicle together. It is an object to thereby reduce the slope of the slopes in the cam track. With this improved loader for cargo containers the coupling zone is increased from about 16 feet to 26 feet full scale so that a vehicle or railway car positioned within the 26 foot zone of tolerance can be coupled by the loader for a transfer movement by the loader. It is an object to increase this coupled zone from 16 feet to have better chance to couple in succession each section of an articulated railway car and separable coupled cars. to move and index the sections and cars with the loader as the loader loads or unloads containers from the cars as in my U.S. Pat. No. 4,746,257.

It is an object to design the cam track that supports the load arm of the rotary loader to compensate for the swing of the linkages where they are pushed back or moved forward as the loadspreader is turned to and from alignment with a vehicle so that compensation is made for the lift caused by the swinging of the linkage. This lift has been found to be minor and easily corrected by adding wedges under the cam track rails.

It is an object to add a weight to each of the swinging linkages to extend the linkages and loadspreader outward for greater coupling reach and to utilize the portion of the arc of the linkages swing with least change of height for the loadspreader as the loader engages and disengages with a vehicle or other object for transfer.

It is an object to apply this invention of loadspreader support to loaders in general.

These other and further objects should become apparent to those skilled in the art by study of this specification with reference to the accompanying drawings wherein:

FIG. 1 is a plan view of a rotary loader having an independent linkage for supporting each end of the loadspreader, shown in normal position.

FIGS. 2 and 3 are side elevations of the loader of FIG. 1 in respectively normal position and in position as if fully engaged with a railway car in tangential position.

FIG. 4 is a perspective view of the loader of FIGS. 1-3 engaging or disengaging a vehicle at an angle off from tangency where maximum turning of the loadspreader occurs to make alignment.

FIG. 5 is a section on line 5—5 of FIG. 1 to show a link assembly on the loader and a rocked or tiled position of the assembly partially in phantom.

FIG. 6 is a side view of FIG. 5.

FIG. 7 is a sectional view of an alternative mounting of the links.

Figure 8:
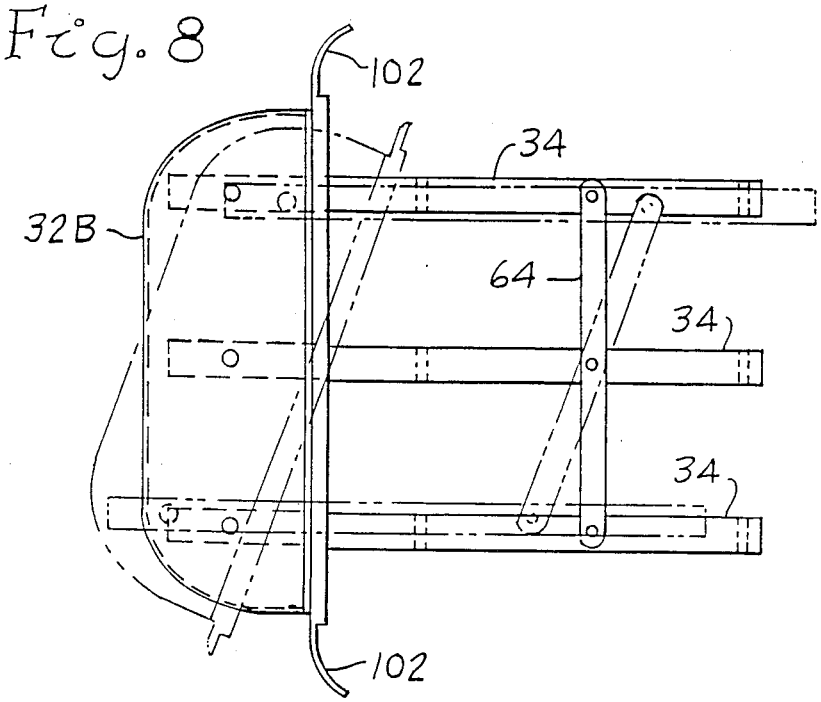
FIG. 8 is a plan view of a loadspreader supported on three linkage arms with tie link.

Referring to the drawings and in particular to FIGS. 1-6; rotary loader 20 has a low pivot post 22, a circular cam lift track 24 having two rails 26 and 27 substantially concentric about post 22, a trunnion collar 28 mounted between collars 29 to revolve on the pivot post, a load support arm frame 30 supporting a load spreader 32 pivotally mounted on parallel beams 34 suspended by a plurality of swinging links 36 thus forming a plurality of separate swinging vertical linkages suspending the loadspreader. Frame 30 has two or more parallel substantially horizontal top beam, tubular members 37, supported on a leg frame 38 comprising a cross member 39 and a depending leg post 40 at each end and each having a drive wheel 42 on the bottom, one on each rail 26 and 27 outward of members 37. A rear or inner cross member 44 connects members 37 above the pivot post and a substantially vertical member 46 extends down from member 44 to a connection with the trunnion 28 so the outer end of arm frame 30 can swing up and down as it revolves around cam track 24 up and down similar slopes 50, FIG. 4, in rails 26 and 27 spaced so wheels 42 carry frame 30 up and down equally.

Two linkage rockers 52 are spaced and secured on top of each beam member 37, one at the forward or outer end of member 37 beyond the leg frame 38 and one back toward the pivot 22. Each linkage rocker 52, as best seen in FIGS. 5 and 6, has a transverse rocker or teeter-toter pin 54 mounted at the center of its length to rock on a longitudinal support pin 56 mounted fixed between two end plates 58 secured upright to beam 37. The swinging links 36 are secured to swing on each end of each rocker pin 54 which spaces the links to straddle beam 37 with clearance to rock transversely and swing longitudinally of beam 37. Each link 36 is similarly connected by a rocker 52 at their bottom pivot below beam 34. The load beams 34 are each directly under a beam 37 and are secured on top of the lower linkage rockers 52 directly under the linkage rocker above when the links 36 are vertical, thus forming a separate parallelogram of the top beam 37, the lower beam 34, and the links 36 connecting them into one signal parallelogram on each side of the arm frame 30. The links 36 at the back of frame 30 are in compression and so are connected by a web plate 84 to give ridigity.

Beams 34 of each parallelogram extend out forward beyond links 36 to support the loadspreader on a pivot disc 60 to rotate on pin 62. Beams 34 are pivotally connected by the loadspreader and by a tie link 64 at right angles to the beams when links 36 are vertical. Each parallelogram linkage is free to swing differently lengthwise the arm frame 30 to turn the loadspreader. The loadspreader has an alignment roller 68 or equal at each end to engage a vehicle V to rotate the loadspreader into alignment by moving the engaging side linkages' links 36 back as the loader is rotated. The following linkage will then swing its links 36 out at the bottom to move its pivot disc 60 outward to align the loadspreader lengthwise the vehicle giving more degrees of arc of alignment than my earlier loaders with one pivot post. The swinging of the linkages unequally especially oppositely brings beams 34 slightly closer to each other, which is taken care of by the rocker pins 54 tilting the parallelogram linkages in at the bottom. Beams 34 are then held upright (instead of tilting) by the loadspreader 32 and tie link 64, since the lower rockers 52 take up the tilt to leave the disc 60 flat against the loadspreader whenever the linkages are swung into nonparallel planes. Vertical guide rollers 70 on extension arms 72 from legs 40 engage the outfacing side faces of beams 34 when the linkages are in vertical planes to limit outward side-swing of the linkages.

A weight 76 extended on members 78 and 79 back from a link 36 on each parallelogram linkage extends the linkage forward at the bottom to better utilize the swing of the linkage through an arc having least vertical movement. These weights increase the speed of alignment while overcoming friction.

Each wheel 42 of the loader is powered by a motor M to move the loader into side coupling position with a vehicle following a tangential path past the loader where slopes 50 effect transfer at tangency. The loader is powered to move a cut of one or more railway cars V to index them to position for successive transfers as it transfers a load to or from the cars according to the direction of rotation of the loader. For further details for operation of the loaders see my U.S. Pat. No. 4,746,257.

VARIATIONS

FIGS. 7–10 show some variations of the rotary loader wherein similar parts are given the same member or a suffix letter added to indicate a variation.

FIG. 7 shows a variation using rocker pin 54A mounted through ball joints 82 as an alternative to having the support pins 56 through the rocker pins.

Figure 9:
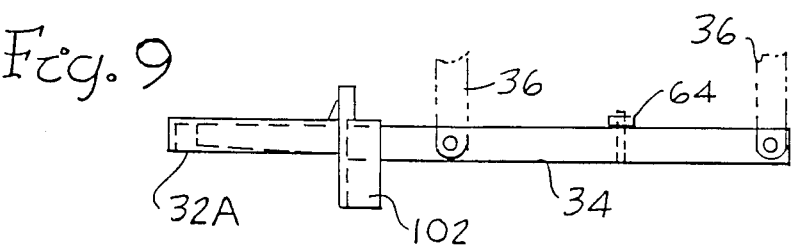
FIG. 9 is a side elevation of FIG. 8 with swinging links partly shown in phantom.
Figure 10:
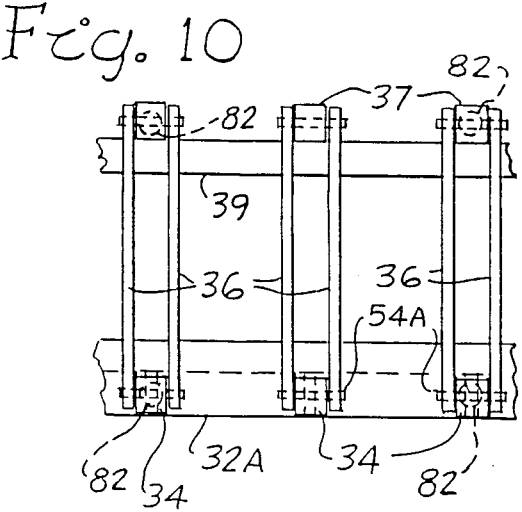
FIG. 10 is an inner end elevation of a variation on the loader of FIG. 1 supporting the loadspreader of FIGS. 8 and 9.

Referring to FIGS. 8–10 where a variation of the loadspreader 32B is shown on three beams 34. This would be supported on the loader of FIG. 1 with the addition of a central top beam 37, FIG. 10. The links 36 from the central beam 37 are secured on fixed pins 54A, since they do not rock transversely and therefore guide rollers 70 can be omitted. The loadspreader 32B of FIGS. 8 and 9 has curved locating fenders or horns 102, which are optional to rollers 68.

The application of this invention should not be limited to rotary loaders, since a loader that can be moved or extended straight to and from a side of a vehicle or load position at an oblique angle up to over 30 degrees from straight to the side of the object it can be within its design limits to align the loadspreader with the object made to work therewith.

Having thus described a few of my loaders with plural independent swinging linkages for supporting the loadspreader it is understood that various loaders are or can be improved with this invention. Therefore I do not wish to be limited to those disclosed herein but desire to cover the full application of this invention with the appended claims.

I claim as my invention:

1. In a loader having a loadspreader for engaging against a vehicle at an angle from the side and turned by the engagement to align and to lift or lower a load for transfer from or to the vehicle and a rotary load support arm frame mounted to describe a horizontal arc tangent to a path for said vehicle to move for transfer; two parallel beams each pivotally connected to said loadspreader, each of said beams supporting an end of said loadspreader, parallel and equal free-swinging vertical links, rocking pivot means connecting each of said swinging vertical links to a said beam and to said load support frame to form two parallelogram linkages to support said loadspreader to swing in and out radially to said support frame, said linkages being free to swing in opposite directions even at the same time and rock sidewise to the planes of the linkages to rotate said loadspreader when said loadspreader is brought against said vehicle at an angle to turn to align parallel and cushion against and move with the vehicle for a distance along which the loader and vehicle are moved along together in alignment for transfer therebetween.

2. A loader as in claim 1, and a horizontal swivel plate on each said beam to support the loadspreader flat thereon to rotate.

3. A loader as in claim 1, said rocking pivot means including brackets on said frame and on said beams, a support pin through each said bracket, rocker pins, each said support pin intersecting at right angles and central on each of said rocker pins, and one of said swinging links pivotally secured on each end of each of said rocker pins.

4. A loader as in claim 1 and a weight and means extending the weight from one of said linkages in a direction away from said loadspreader, said weight and extension being on at least one of said swinging links of each of said parallelogram linkages to extend the linkages forward at the bottom to extend the loadspreader forward to swing back through vertical position of the links when engaging a vehicle.

5. A loader as in claim 1, there being more than two said beams for supporting the loadspreader.

6. A side-engaging self-aligning loader including a loadspreader and a plurality of separately swinging parallelogram linkages supporting said loadspreader, each said parallelogram linkage having a substantially horizontal beam extension out beyond and substantially in the plane of the parallelogram linkage, a vertical pivot support on said beam extension of each of said linkages pivotally supporting said loadspreader, each said vertical pivot support being aligned in a substantially straight line (i.e. row), a tie link pivotally connecting said beams in a parallel line to said line a distance away from said loadspreader, and rocking means for keeping said pivots parallel when said parallelogram linkages are unequally shifted.

7. A loader as in claim 6, each said beam extending along near the bottom of each of said parallelogram linkages.

8. A loadspreader support including the loadspreader, two beams pivotally attached to said loadspreader each at a point spaced apart to support each end of said loadspreader, means for supporting each said beam separately and equally, free to move lengthwise and sidewise to and from each other, and alignment means for shifting said beams oppositely lengthwise to turn said loadspreader to align for transfer.

* * * * *